United States Patent
Grigg et al.

(10) Patent No.: US 9,508,070 B2
(45) Date of Patent: *Nov. 29, 2016

(54) TRANSACTION PREPARATION USING MOBILE DEVICE

(71) Applicant: Bank of America Corporation, Charlotte, NC (US)

(72) Inventors: David M. Grigg, Rock Hill, SC (US); Matthew A. Calman, Charlotte, NC (US); Carrie Anne Hanson, Charlotte, NC (US); Marc Lance Warshawsky, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 446 days.

This patent is subject to a terminal disclaimer.

(21) Appl. No.: 13/690,091

(22) Filed: Nov. 30, 2012

(65) Prior Publication Data

US 2014/0156536 A1 Jun. 5, 2014

(51) Int. Cl.
G06Q 20/00 (2012.01)
G06Q 20/32 (2012.01)
G06Q 30/00 (2012.01)

(52) U.S. Cl.
CPC ...... *G06Q 20/3224* (2013.01); *G06Q 20/3278* (2013.01); *G06Q 30/016* (2013.01)

(58) Field of Classification Search
USPC ................................................ 705/304, 7.15
See application file for complete search history.

(56) References Cited

U.S. PATENT DOCUMENTS

| | | | |
|---|---|---|---|
| 6,615,186 B1 * | 9/2003 | Kolls | B60R 25/04 340/988 |
| 7,788,151 B2 * | 8/2010 | Pizzi | G06Q 40/00 705/35 |
| 7,801,758 B2 | 9/2010 | Gracie et al. | |
| 7,941,368 B2 | 5/2011 | Chang et al. | |
| 7,974,867 B2 | 7/2011 | Gracie et al. | |
| 8,091,778 B1 * | 1/2012 | Block | G06Q 20/1085 235/379 |
| 8,925,826 B2 * | 1/2015 | Liu | G06Q 20/02 235/487 |
| 2003/0078849 A1 * | 4/2003 | Snyder | A47F 9/047 705/23 |

(Continued)

OTHER PUBLICATIONS

Phoebz. (Nov. 5, 2009). Geekiegadgets. Retrieved from Geekiegadgets: https://web.archive.org/web/20091105102701/http://www.geekiegadgets.com/2009/dial-and-talk-handsfree-with-the-cartel-ct-2000-in-car-bluetooth-handsfree-system/.*

(Continued)

*Primary Examiner* — John Hayes
*Assistant Examiner* — El Mehdi Oussir
(74) *Attorney, Agent, or Firm* — Michael A. Springs; Moore & Van Allen PLLC; Anup Shrinivasan

(57) ABSTRACT

Embodiments of the invention are directed to systems, methods and computer program products for performing preliminary steps of a transaction on a mobile device. In some embodiments, a system is configured to: determine a user has entered a facility, wherein the user has a mobile device, and wherein the user is waiting to interact with at least one of an agent at or away from the facility or a computing device at the facility; communicate with the mobile device to determine a reason for the user's visit to the facility, the reason comprising a transaction intended to be executed by the user at the facility; transmit a form to the user's mobile device, the form being based on the intended transaction, and the form prompting the user to input information associated with the intended transaction; receive the user-filled form from the user's mobile device.

15 Claims, 7 Drawing Sheets

(56) References Cited

U.S. PATENT DOCUMENTS

| | | |
|---|---|---|
| 2007/0255854 A1 | 11/2007 | Khosravy et al. |
| 2009/0119371 A1 | 5/2009 | Chang et al. |
| 2009/0125598 A1 | 5/2009 | Sun et al. |
| 2011/0014905 A1 | 1/2011 | Eschenauer et al. |
| 2011/0029399 A1* | 2/2011 | Asher ............... G06Q 20/102 705/26.1 |
| 2011/0093326 A1* | 4/2011 | Bous .................. G06Q 30/02 705/14.38 |
| 2011/0153312 A1 | 6/2011 | Roberts |
| 2011/0264572 A1* | 10/2011 | Cucinotta ........... G06Q 20/042 705/34 |
| 2012/0160912 A1* | 6/2012 | Laracey ............ G06Q 20/1085 235/379 |
| 2012/0240218 A1* | 9/2012 | Jansto ................ G06F 9/4418 726/16 |
| 2013/0262275 A1* | 10/2013 | Outwater ............... G06Q 10/02 705/27.1 |
| 2013/0297422 A1* | 11/2013 | Hunter ............... G06Q 30/0261 705/14.58 |

OTHER PUBLICATIONS

Harkins, S. (Aug. 28, 2008). TechRepublic. Retrieved from http://www.techrepublic.com/blog/microsoft-office/return-to-the-record-you-were-working-on-when-you-reopen-an-access-form/.*

Phoebz. (Nov. 2, 2009). Geekiegadgets. Retrieved from Geekiegadgets: https://web.archive.org/web/20091105102701/http://www.geekiegadgets.co m/2009/dial-and-talk-handsfree-with-the-cartel-ct-2000-in-car-bluetooth-handsfree-system/.*

* cited by examiner

TRANSACTION PREPARATION USING MOBILE DEVICE

BACKGROUND

When a user enters a physical facility of an entity (e.g., a financial institution), there is a need to assist the user as quickly as possible.

BRIEF SUMMARY

Embodiments of the invention are directed to systems, methods and computer program products for serving a user at a facility. In some embodiments, an apparatus is provided for serving a user at a facility. The apparatus comprises: a memory; a processor; and a module stored in the memory, executable by the processor, and configured to: determine a user has entered a facility or is a predetermined distance from the facility, wherein the user has a mobile device, and wherein the user is waiting to interact with at least one of an agent at the facility or a computing device at the facility; communicate with the mobile device to determine a reason for the user's visit to the facility, the reason comprising a transaction intended to be executed by the user at the facility; transmit a form to the user's mobile device, the form being based on the intended transaction, and the form prompting the user to input information associated with the intended transaction; and receive the user-filled form from the user's mobile device.

In some embodiments, the facility is associated with an entity.

In some embodiments, the user has an account managed by the entity.

In some embodiments, the entity comprises a financial institution.

In some embodiments, the module is configured to determine a wait period for the user to interact with the agent at the facility or the computing device at the facility, and wherein a type of the form transmitted to the user's mobile device is based on the wait period.

In some embodiments, the user-filled form is at least one of viewed by the agent at the facility or processed by the apparatus.

In some embodiments, in response to receiving the user-filled form, the module is configured to direct the user to the agent at the facility or the computing device at the facility.

In some embodiments, the module is further configured to identify the user based on information received from the mobile device, the information comprising at least one of information associated with the mobile device, information associated with the user, or information associated with the user's account.

In some embodiments, in response to identifying the user, the module is further configured to transmit information to the mobile device.

In some embodiments, the transmitted information comprises information associated with one or more transactions frequently executed by the user during a predetermined period, wherein the transmitted information guides the user on how to execute the one or more frequently executed transactions without visiting the facility.

In some embodiments, the transmitted information comprises audiovisual content.

In some embodiments, the module is further configured to transmit information associated with the intended transaction to the mobile device, wherein the information enables the user to execute the transaction on the mobile device.

In some embodiments, the information enables the user to execute the transaction without interacting with the agent associated with the facility.

In some embodiments, the communication occurs via one or more long-range or short-range wireless communication methods or via readable indicia.

In some embodiments, the communication with the mobile device comprises: prompting the user to input the reason for the user's visit on the mobile device; and receiving the reason for the user's visit from the mobile device, wherein the user inputs the reason by inputting text or voice into the mobile device or by selecting one or more transactions from a list of transactions presented on a user interface of the mobile device.

In some embodiments, the list of transactions comprises at least one of a last transaction executed by the user, a transaction most frequently executed by the user during a predetermined period, a transaction most frequently executed by users who visit the facility, or a transaction most frequently executed by users who visit the facility with a similar user profile as the user.

In some embodiments, the user entered the facility via a drive-through lane associated with the facility.

In some embodiments, the mobile device comprises or is part of a motor vehicle.

In some embodiments, the module enables the user to bookmark a partially completed form.

In some embodiments, a method is provided for serving a user at a facility. The method comprises: determining a user has entered a facility, wherein the user has a mobile device, and wherein the user is waiting to interact with at least one of an agent at the facility or a computing device at the facility; communicating with the mobile device to determine a reason for the user's visit to the facility, the reason comprising a transaction intended to be executed by the user at the facility; transmitting a form to the user's mobile device, the form being based on the intended transaction, and the form prompting the user to input information associated with the intended transaction; and receiving the user-filled form from the user's mobile device.

In some embodiments, a computer program product is provided for serving a user at a facility. The computer program product comprises a non-transitory computer-readable medium comprising a set of codes for causing a computer to: determine a user has entered a facility, wherein the user has a mobile device, and wherein the user is waiting to interact with at least one of an agent at the facility or a computing device at the facility; communicate with the mobile device to determine a reason for the user's visit to the facility, the reason comprising a transaction intended to be executed by the user at the facility; transmit a form to the user's mobile device, the form being based on the intended transaction, and the form prompting the user to input information associated with the intended transaction; and receive the user-filled form from the user's mobile device.

BRIEF DESCRIPTION OF THE DRAWINGS

Figure 1:
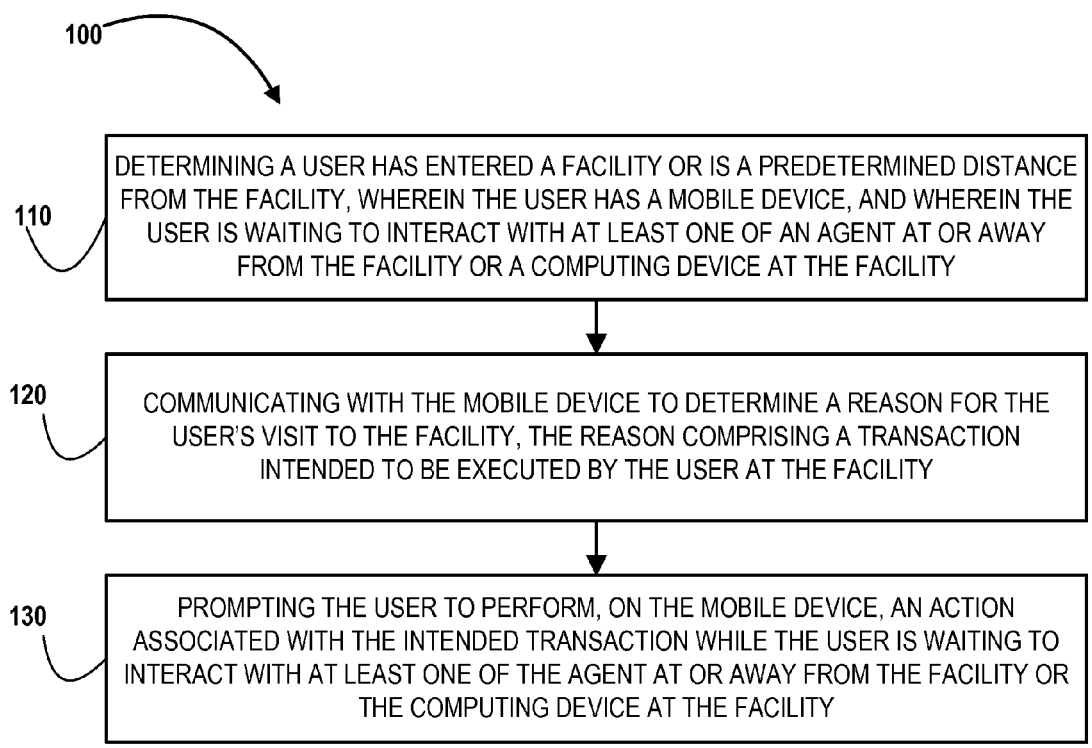
Figure 2:
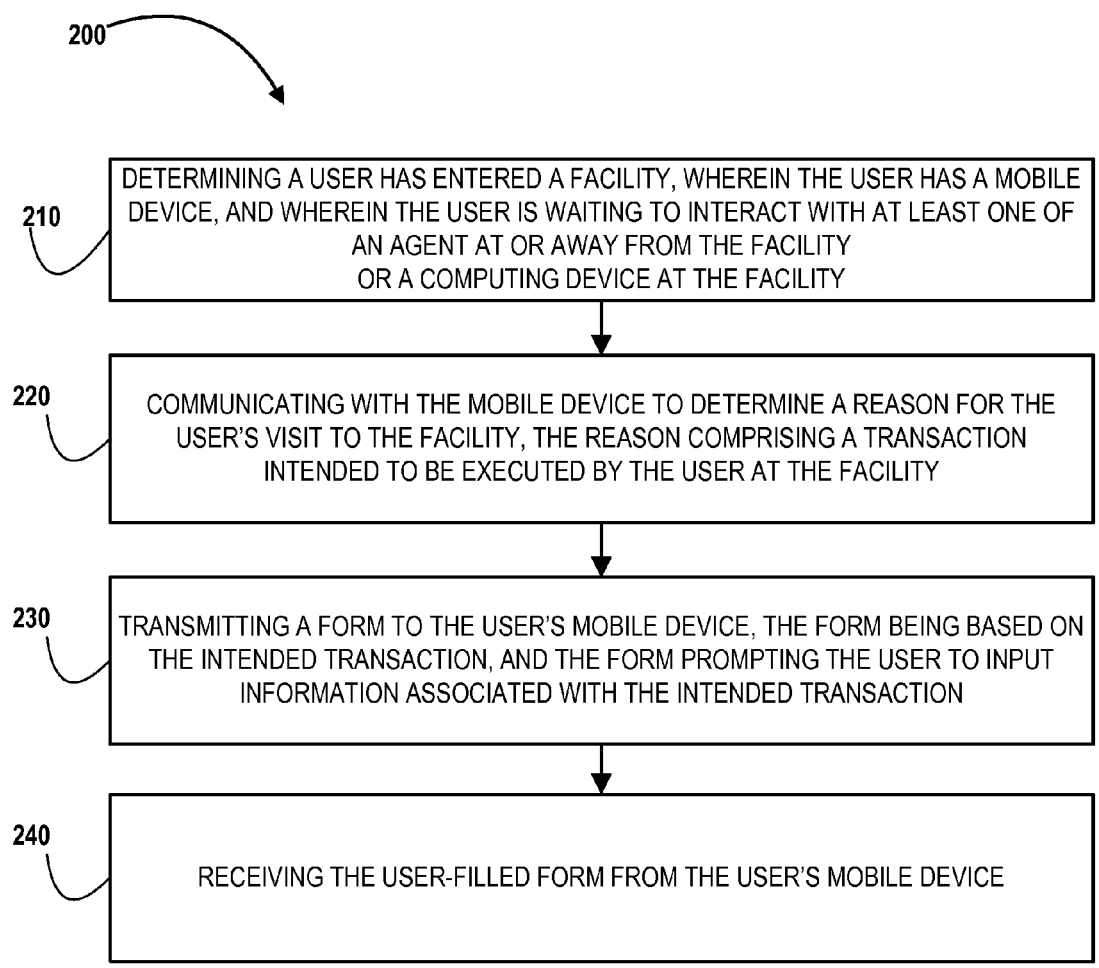
Figure 3:
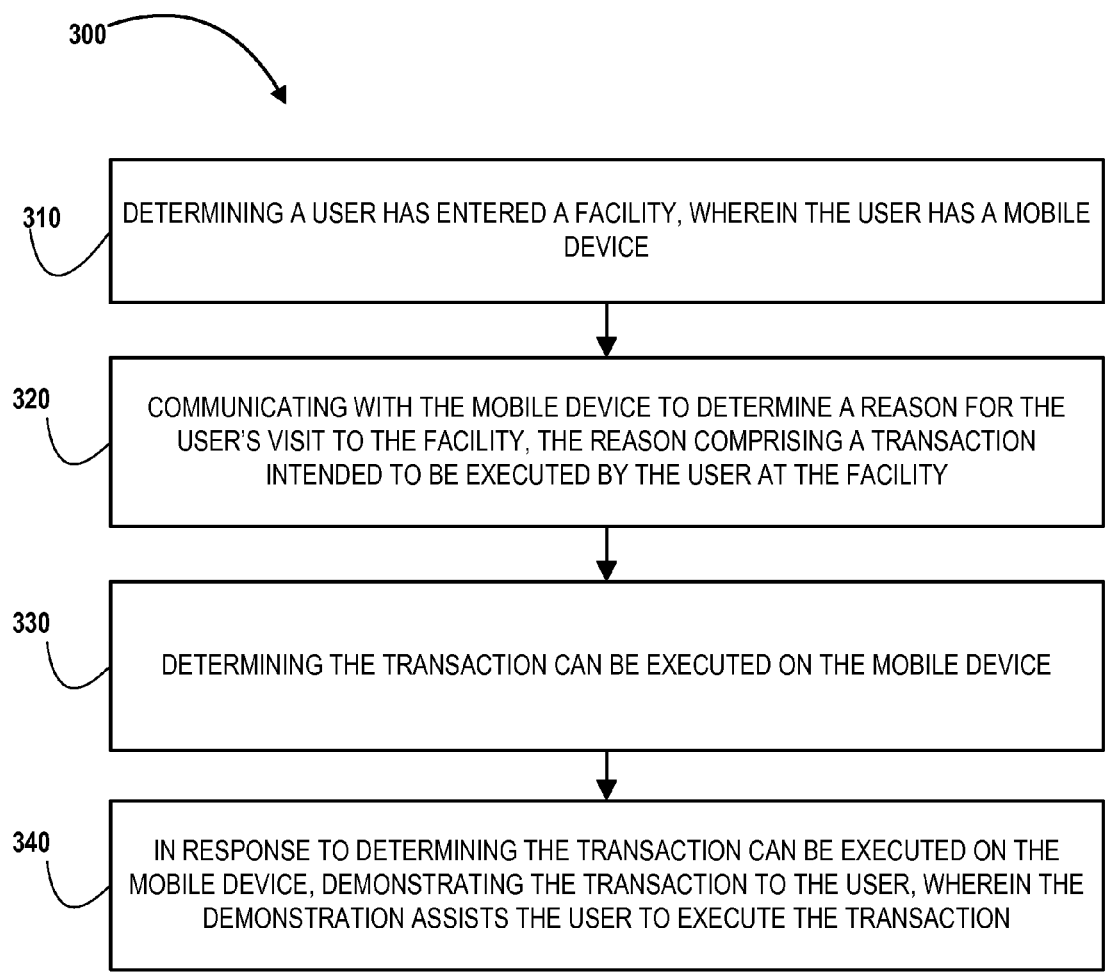
Figure 4:
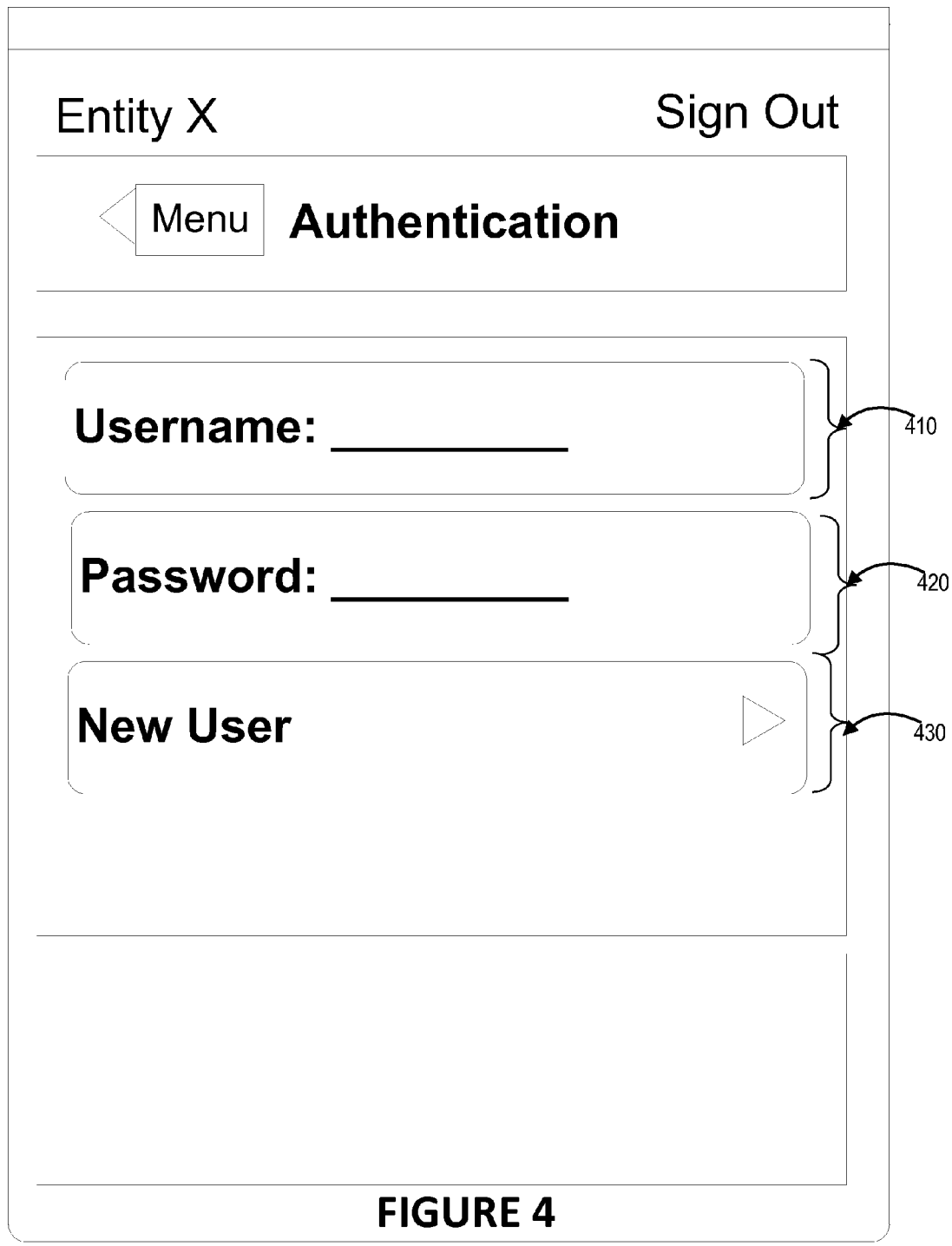
Figure 5A:
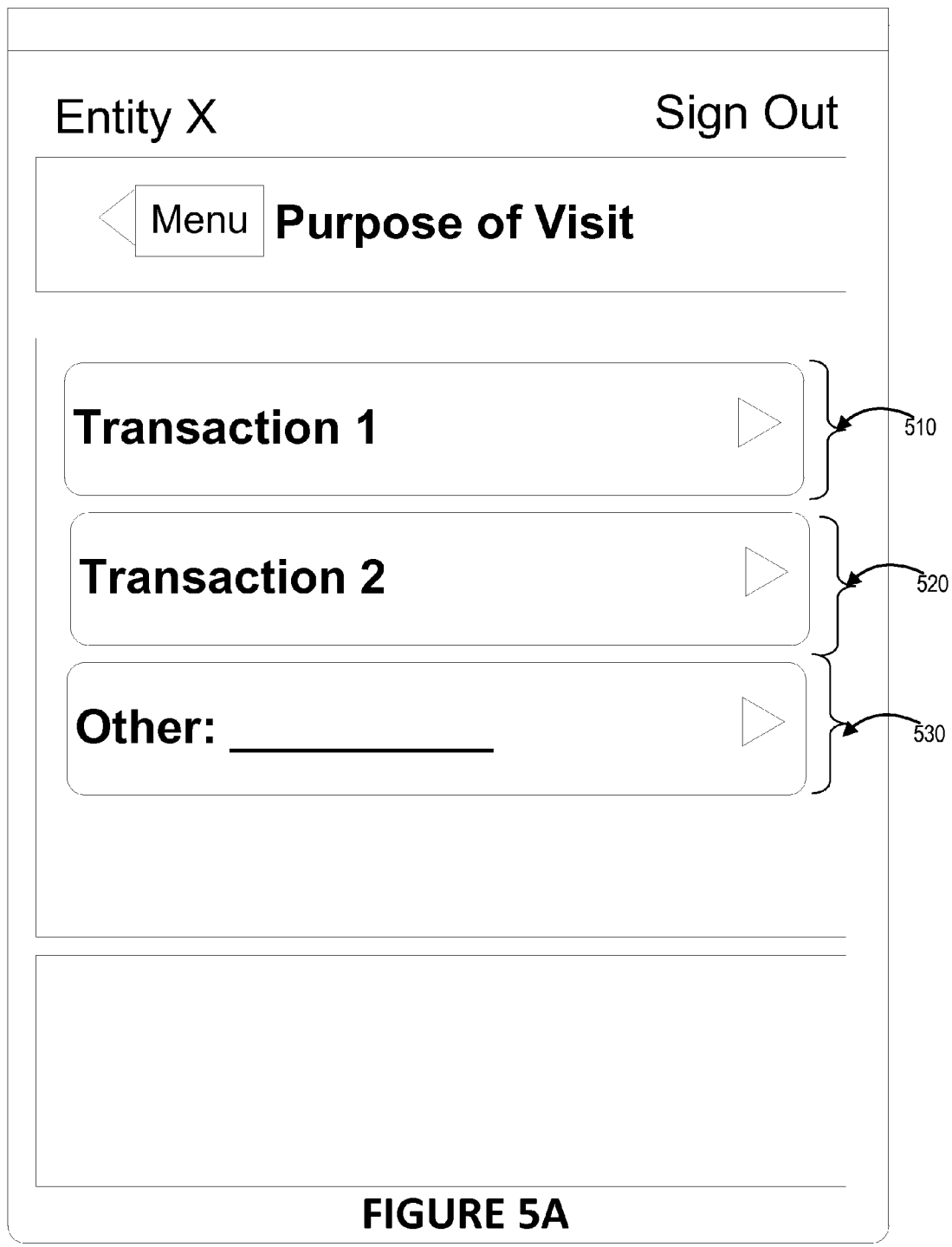
Figure 5B:
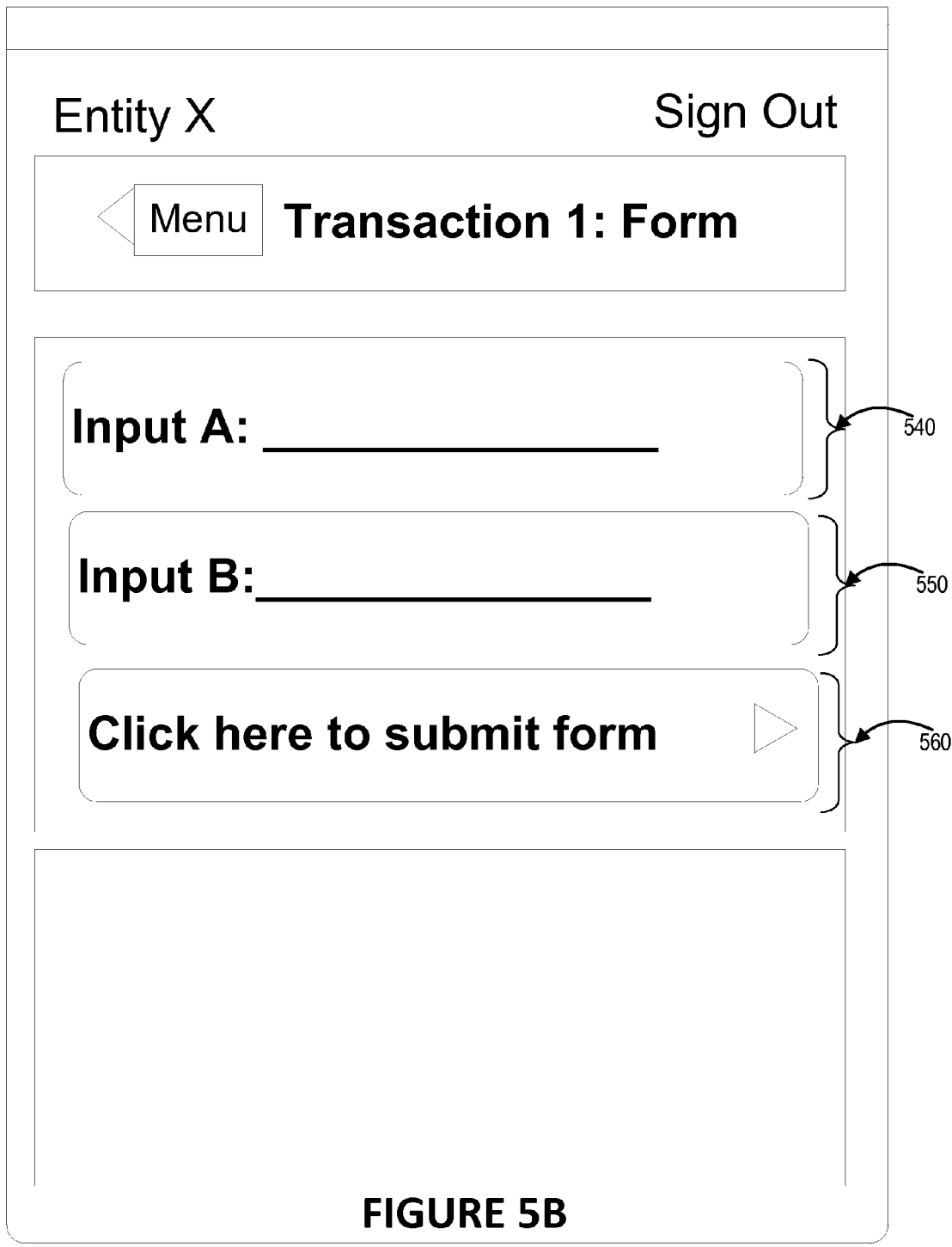
Figure 6:
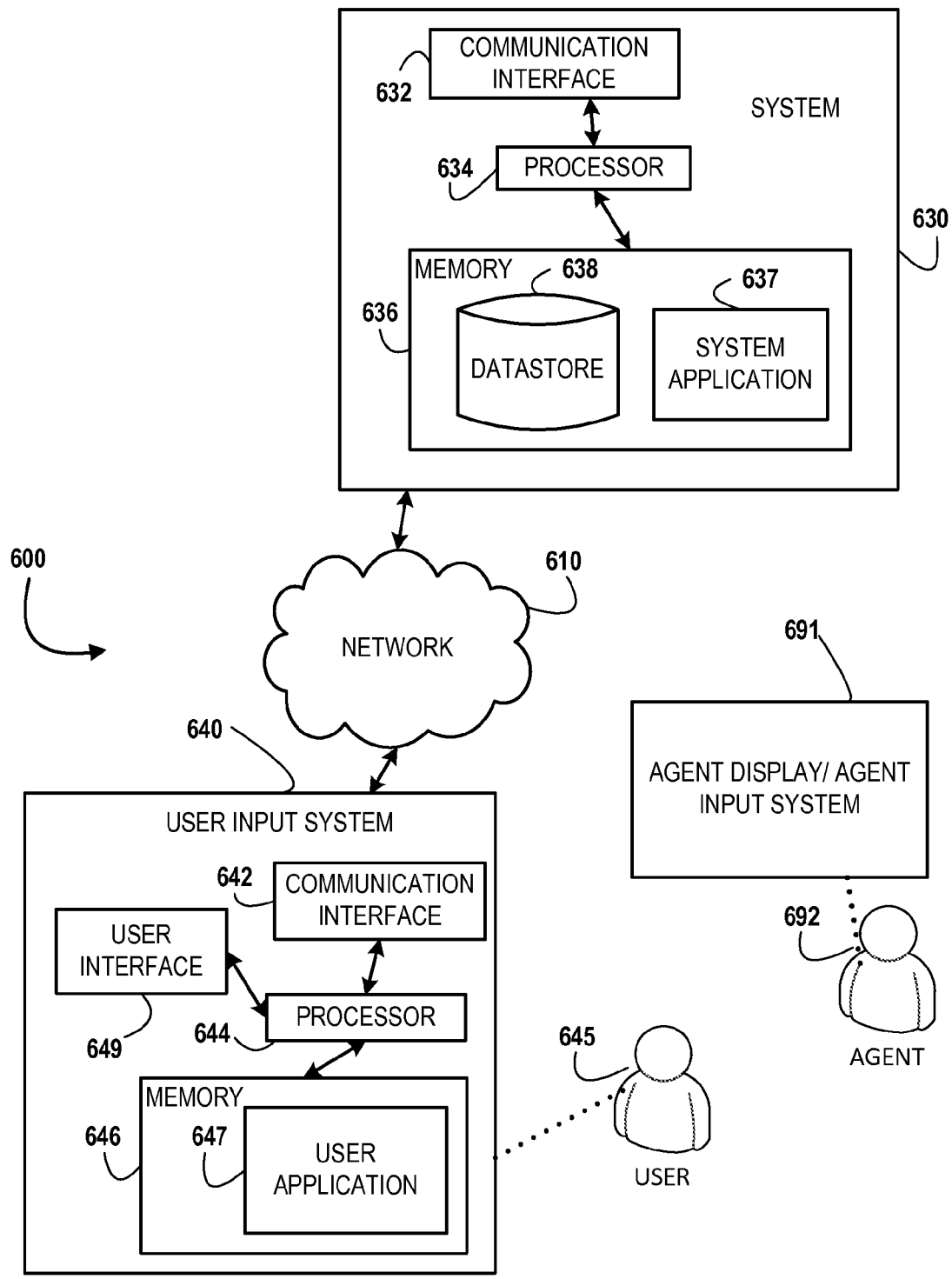

Having thus described embodiments of the invention in general terms, reference will now be made to the accompanying drawings, where:

FIG. 1 is a flowchart illustrating a general process flow for serving a user at a facility, in accordance with embodiments of the present invention;

FIG. 2 is another flowchart illustrating a general process flow for serving a user at a facility, in accordance with embodiments of the present invention;

FIG. 3 is a flowchart illustrating a general process flow for serving a user at a facility, in accordance with embodiments of the present invention;

FIGS. 4, 5A, and 5B illustrate user interfaces for serving a user at a facility, in accordance with embodiments of the present invention; and FIG. 6 is a block diagram illustrating technical components of a system for serving a user at a facility, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for serving a user at a facility (e.g., a branch office of a financial institution). The present invention enables a user to reduce the amount of time spent on executing a transaction at a facility.

In some embodiments, an "entity" as used herein may be a financial institution. A "facility" may be physical premises associated with the entity. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, etc. The account is associated with and/or maintained by the entity. In other embodiments, an "entity" may not be a financial institution. In other embodiments, an entity may or may not allow the user to establish an account associated with the entity.

In some embodiments, the "user" may be a customer (e.g., an account holder or a person who has an account (e.g., banking account, credit account, etc.) at the entity) or potential customer (e.g., a person who has submitted an application for an account, a person who is the target of marketing materials that are distributed by the entity, a person who applies for a loan that not yet been funded). The user may enter the facility or be within a predetermined distance of the entrance to the facility or a system associated with the facility when the user's mobile device establishes communication with the system associated with the facility. The system may be located in the facility or may be located remotely from the facility. An agent may be associated with the facility. The agent may be a human or virtual agent (e.g., computer agent). The agent may be located at the facility or located remotely from the facility. As an example, a computer agent may be associated with the facility may comprise an automated teller machine (ATM) associated with the facility or any other computing system that enables the user to perform a transaction associated with the user's account. Additionally or alternatively, a computer agent associated with the facility may be audio or video conferencing system that enables the user to converse with a human agent (or another computer agent) associated with the entity. In some embodiments, the user may enter the facility using an automobile. For example, the user may enter a drive-through lane associated with the facility.

Referring now to FIG. 1, a general process flow 100 is provided for serving a user at a facility. At block 110, the method comprises determining a user has entered a facility, wherein the user has a mobile device, and wherein the user is waiting to interact with at least one of an agent at the facility or a computing device at the facility. At block 120, the method comprises communicating with the mobile device to determine a reason for the user's visit to the facility, the reason comprising a transaction intended to be executed by the user at the facility. At block 130, the method comprises prompting the user to perform, on the mobile device, an action associated with the intended transaction while the user is waiting to interact with at least one of the agent at the facility or the computing device at the facility. Therefore, the present invention enables an apparatus (e.g., a computing system) associated with the facility to communicate with the user's mobile device. The action associated with the intended transaction enables the user to at least partially or entirely execute the transaction on the mobile device. When the action comprises partially executing the transaction on the mobile device, the method may further comprise directing the user to the agent at the facility immediately upon or a predetermined period after the user performs the action on the mobile device. The agent may assist the user to complete the rest of the transaction.

Referring now to FIG. 2, a general process flow 200 is provided for serving a user at a facility. At block 210, the method comprises determining a user has entered a facility, wherein the user has a mobile device, and wherein the user is waiting to interact with at least one of an agent at the facility or a computing device at the facility. At block 220, the method comprises communicating with the mobile device to determine a reason for the user's visit to the facility, the reason comprising a transaction intended to be executed by the user at the facility. At block 230, the method comprises transmitting a form to the user's mobile device, the form prompting the user to input information associated with the intended transaction. At block 240, the method comprises receiving the user-filled form from the user's mobile device.

Referring now to FIG. 3, a general process flow 300 is provided for serving a user at a facility. At block 310, the method comprises determining a user has entered a facility, wherein the user has a mobile device, and wherein the user is waiting to interact with at least one of an agent at the facility or a computing device at the facility. At block 320, the method comprises communicating with the mobile device to determine a reason for the user's visit to the facility, the reason comprising a transaction intended to be executed by the user at the facility. At block 330, the method comprises determining the transaction can be executed on the mobile device n. At block 340, the method comprises in response to determining the transaction can be executed on the mobile device, demonstrating the transaction to the user, wherein the demonstration assists the user to execute the transaction.

When a user enters a facility, there may be a predetermined wait period prior to the user's interaction with an agent at the facility. The waiting period may be the waiting period on a drive-through lane prior to the user reaching a drive-through window or prior to the user reaching an audio or video conferencing system to talk to an agent associated with the facility. The duration of the wait period may be based on the purpose of the user's visit to the facility. A purpose of the user's visit may include a transaction that the user intends to perform at the facility. As used herein, a transaction comprises at least one of opening an account, depositing a check into an existing account, making a withdrawal, paying a bill, making a funds transfer, changing authentication credentials for an account, purchasing a security using funds in an account, obtaining a loan, ordering checks, disputing a transaction, chatting with an agent, obtaining a statement of an account, activating an offer, changing user information (e.g., name, contact information, or the like) on an account, setting up direct deposit, setting up over-expenditure protection, obtaining a copy of a brochure, taking a picture, or the like. As used herein, a transaction is not limited to an activity associated with the user's account. Any activity performed by the user at the facility may be referred to as a transaction. Additionally, a transaction may comprise more than one activity. As an example, one activity might be executed on the mobile device, another activity may be automatically executed by the system described herein, and still another activity may be executed by a human agent who is assisting the user.

When the user enters the facility or is within a predetermined distance from the facility, the system establishes communication with a mobile device carried by the user. For example, the system may transmit a message to the mobile device (e.g., a text message, pop-up message, email, social networking message, financial institution network message, or the like). The message may be transmitted to the mobile device when the system detects the presence of the mobile device. Alternatively or additionally, the message may be transmitted to the mobile device when the mobile device is within a predetermined distance of the facility or the mobile device is detected to be in or near the facility based on location coordinates (e.g., global positioning system GPS coordinates) associated with the mobile device. The message may prompt the user to input a reason for the user's visit the facility on a form presented on the mobile device user interface. The user may subsequently input the user's reason (e.g., the user may input a description of the transaction intended to be executed by the user). For example, the user may input "opening new account," "depositing a check," "cash withdrawal," or the like. The user may input the user's reason by text input, voice input, or the like. As a further example, the mobile device user interface may prompt the user to select from one of several transactions presented as a list. The list may include the last transaction executed by the user and/or transactions most frequently executed by the user and/or transactions most frequently executed by users who visit the facility and/or transactions most frequently executed by users who with a similar user profile (e.g., similar age, account balance, occupation, location, or the like) as the user. The user may select one or more of the listed transactions or may input the name or description of another transaction if the user's intended transaction is not presented in the list. The mobile device may subsequently transmit a message to the system described herein, wherein the message includes the user's reason for visiting the facility. The system may subsequently compute the waiting period based on the reason or purpose for the user's visit. The waiting period may be subsequently communicated from the system to the mobile device.

Additionally or alternatively, the user may "check-in" at the facility using the user's mobile device. For example, the user may authenticate to an application on the mobile device (e.g., a social networking application, a banking application, or the like) and manually specify that the user has entered or is about to enter the facility or will enter the facility within a predetermined period in the future. Additionally or alternatively, the application on the mobile device may automatically "check-in" the user based on determining the user's mobile device has entered or is within a predetermined distance of entering the facility. Additionally, or alternatively, the user may "check-in" at a computing device at the facility. This act of "checking-in" prompts a system described herein to establish communication with (e.g., transmit a message to) the user's mobile device.

Referring now to FIG. 4, FIG. 4 presents a user interface that is presented to the user when the user enters the facility or when the user is a predetermined distance from the facility, in accordance with some embodiments of the invention. If the user has an existing account, the user may enter the user's username 410 and password 420. If the user is successfully authenticated to the account, a message indicating the successful authentication is transmitted to the system described herein. The message may be transmitted to the system from the mobile device or from some other remote network server. If the user is a new user, the user selects the 'New User' 430 tab. When the user selects this option, the user may be subsequently presented with a form that enables the user to enter information associated with the user (name, contact information, purpose of or reason for visit, or the like).

Either prior to or after determining the reason for the user's visit to the facility or either prior to or after identifying the user, the system transmits information to the mobile device. The information comprises information associated with at least one of: a transaction intended to be executed by the user at the facility, a last transaction executed by the user (e.g., at the facility, on the phone, on the Internet, or the like), a transaction most frequently executed by the user within a predetermined period such as the previous two months (e.g., at the facility, on the phone, on the Internet, or the like), a transaction most frequently executed (e.g., at the facility, on the phone, on the Internet, or the like) by users who visit the facility, or a transaction most frequently executed (e.g., at the facility, on the phone, on the Internet, or the like) by users who visit the facility with a similar user profile as the user, or the like. For example, the information may include advice on how the user can execute the transaction (e.g., via the user's mobile device or personal computing device) without the assistance of an agent at the facility. The information may include a list of text-based instructions or audiovisual content (e.g., video demonstrations) on how the user may self-execute the transaction.

The system may determine that the transaction intended to be executed by the user may be executed (either completely or partially) on the mobile device. Therefore, the system may determine that the user does not need to spend time waiting to execute the transaction using the assistance of an agent at the facility. The system may subsequently transmit a message to the mobile device, wherein the message indicates that the user may perform the transaction using the mobile device. The system may transmit to the mobile device a link to a demonstration audio or video (or text-based instructions). The user may view the demonstration video (or text-based instructions) or listen to the demonstration audio on the mobile device to learn how to execute the transaction on the mobile device without the assistance of an agent at the facility. For example, if the user is waiting to deposit a check, the demonstration video may be a video of how the user can capture an image of the check and upload the captured check image to the user's account in order to deposit the check. Additionally, the message may include a first selectable option which the user selects if the user chooses to execute the transaction on the mobile device and a second selectable option which the user selects if the user chooses to keep waiting for an agent to obtain assistance for executing the transaction.

Alternatively or additionally, the system may transmit a link to the mobile device, wherein when the user selects the link, an agent at the facility pulls the user from the queue of waiting users and demonstrates to the user how to execute the transaction using a mobile device. For example, the agent may display how to execute the transaction on the display of the agent's computing device (e.g., a tablet computer, a portable mobile communication device such as a mobile phone, or the like). As a further example, the agent may, after receiving the user's permission via the user's mobile device, establish a wireless connection between the agent's computing device (that includes a display) and the user's mobile device. The wireless connection may be established by one or more short-range or long-range wireless communication methods described herein. The connection may enable the mobile device interface to be emulated onto the display of the agent's computing device, thereby enabling the agent and the user to view the mobile device interface on the agent's computing device display. The emulation of the mobile device user interface onto the agent's computing device display captures the "look and feel" of the mobile device user interface. Once the mobile device interface is emulated onto the agent's computing device display, the agent may demonstrate the transaction to the user. The agent's computing device display is visible only to the user and the agent, and is not visible to any other users that might be present at the facility. While the mobile device user interface is emulated onto the agent's computing device display, the mobile device user interface may or may not be simultaneously visible on the mobile device display. Additionally, the mobile device may or may not be used to simultaneously (along with the agent's computing device) control or manipulate the user interface presented on the agent's computing device display. Once the transaction has been executed, the wireless connection between the user's mobile device and the agent's computing device may be disconnected using either device. By demonstrating the transaction to the user, the user can execute the transaction in the future without visiting the facility.

As used herein, emulation refers to reproducing a first computing device user interface onto a second computing device user interface, such that the user interface can be controlled or manipulated using the second device. While the user interface is being controlled or manipulated using the second device, the user interface may or may not be presented on the first device display, and the first device may or may not be able to simultaneously (along with the second device) control or manipulate the user interface presented on the second device.

After determining the user's intended transaction (e.g., based on input information received from the user's mobile device), the system may transmit a form to the mobile device. The form prompts the user to input information associated with the intended transaction. The user may either partially or entirely fill the form. The user may subsequently transmit the form to the system. When the form is received by the system, the system stores the form until the user meets the agent at the facility. In some embodiments, the user's mobile device automatically transmits the form (or the user manually initiates transmission of the form) to the system (or directly to the agent's computing device) as the user approaches the agent. In some embodiments, the system may even process the form. As an example, the form may prompt the user to input authentication credentials to the user's account. Therefore, the system may authenticate the user to the user's account if the authentication credentials are correct. As a further example, if the user (e.g., a new user) is opening a new account, the form may prompt the user to enter the user's name, address, contact information, or the like. The system may process the information to create a user profile for the user. These preliminary processing steps reduce the overall processing time associated with the transaction.

In some embodiments, the user may approach a designated agent in the facility immediately after or a predetermined period after transmitting the form to the system. In some embodiments, immediately after or a predetermined period after transmitting the form to the system, the system transmits a message to the user's mobile device, wherein the message indicates an identity or location (e.g., Agent 1, Virtual Agent 1, or the like) of an agent in the facility who the user can approach in order to obtain assistance with the transaction.

When the user meets the agent, the system pushes the user-filled form to the agent's computing system (or the agent may manually pull the user-filled form based on the user's identification information). The agent may determine whether the system performed any preliminary processing steps. Additionally, the agent may use any further information provided on the user-filled form to perform any further processing steps. For example, either prior to, at, or immediately after the time the user reaches the agent's desk, the agent may access the user's account based on authentication information provided on the user-filled form. As a further example, either prior to, at, or immediately after the time the user reaches the agent's desk, the user may access user profile information (e.g., name, contact information, reason for visit, or the like) transmitted by the user (e.g., a new user) to the system described herein. Additionally, the agent may use any verbal instructions provided by the user to perform any further processing steps. For example, if the user is making a cash withdrawal, the user may verbally provide the amount of cash to withdraw. Additionally, the agent may provide advice to the user. For example, if the user is opening a new account, the agent may provide advice regarding the type of accounts for which the user is eligible. Therefore, when the agent meets the agent, the agent already has access to the user's input transmitted from the user's mobile device (e.g., user-filled forms) and consequently the user does not spend much (or any) time in filling out forms (e.g., preliminary forms) or providing information after meeting the agent.

Referring now to FIG. 5A, FIG. 5A presents a user interface, in accordance with some embodiments of the invention. The user interface may be presented on the user's mobile device when the user enters the facility or is within a predetermined distance of the facility. The user may select the first transaction 510, the second transaction 520, or may input a description of some other transaction 530. As described herein, the first transaction or the second transaction may be at least one of a last transaction executed by the user, a transaction most frequently executed by the user during a predetermined period, a transaction periodically executed by the user, a transaction most frequently executed by users who visit the facility, or a transaction most frequently executed by users who visit the facility with a similar user profile as the user.

As an example, a user may enter the facility associated with a financial institution on a Friday. The system may identify the user based on communication with the user's mobile device as described herein. The system may also determine the day and the time of day. Additionally, the system determines that the user visits the facility ever Friday to deposit a check. This information is communicated to the mobile device. Subsequently, the mobile device's user interface prompts the user whether the user is at the facility to deposit a check. If the user responds 'Yes,' and if there is a waiting period prior to the user reaching an agent to deposit the check, the user interface may offer another channel for depositing the check. The user interface may inform the user that the user can deposit the check via an ATM or via the user's mobile device. Additionally, the user interface presents links to instructions or tutorials (e.g., text-based, audio-visual-based, or the like) if the user wants to explore how to deposit the user's check via these alternative channels.

As a further example, a user may enter the facility on a Wednesday. Since the user has entered the facility on a different day from when the user usually visits the facility, the mobile device user interface may prompt the user to answer what kind of transaction the user is trying to execute at the facility. Additionally or alternatively, the user interface may present the user with the options display in FIG. 5A.

Either prior to or after determining the reason for the user's visit to the facility, the system may identify the user. The system may ping the mobile device for identification information. The mobile device may send identification information associated with at least one of the mobile device or the user to the system. Identification information associated with the mobile device may include a device identification number or the like. Identification information associated with the user may include a name of the user, an account number, a payment card number associated with the account, an alias associated with the account, authentication credentials associated with the account, or the like. For example, when the user enters the facility or is within a predetermined distance to the facility, the system may ping the mobile device and prompt the user to enter authentication credentials associated with the user's account.

Referring now to FIG. 5B, FIG. 5B presents a user interface, in accordance with some embodiments of the invention. Assuming the user selects the first transaction 510 in FIG. 5A, the form presented in FIG. 5B is associated with the first transaction 510. The user may then enter input 540 and 550 on the form, and transmit 560 the form to the system. The input may be associated with information required to execute the first transaction 510.

As described herein, in some embodiments, the user may enter a drive-through lane of the facility using the user's vehicle. When the user's vehicle (or automobile) enters a drive-through lane of the facility, the user's mobile device may be in wireless communication with a touchscreen display in vehicle. The touchscreen display is associated with a computing system integrated into the vehicle. Therefore, any processes or features that are presented on the user interface of the mobile device may be presented on the touchscreen display in the user's vehicle. Additionally, any processes or features that are executed by the mobile device may be executed by vehicle's computing system (e.g., the mobile device functionality is integrated into the vehicle's computing system). Therefore, the system described herein may directly communicate with the user's vehicle such that the user, via the vehicle's display, transmits information to the system, inputs information onto a form, executes a transaction, or the like.

In embodiments where the user enters the drive-through lane of a facility, the user may at least one of identify himself/herself, communicate a reason for the user's visit, and fill out any forms associated with the user's intended transaction while the user is waiting in the drive-through queue. As described herein, the user may enter input via at least one of the user's mobile device or vehicle touchscreen computing system. When the user pulls up to a virtual agent or a human agent, the agent may already have access to any input transmitted from the user's mobile device or vehicle touchscreen computing system.

As used herein, a mobile device may be any portable mobile communication or computing device. As used herein, a network or mobile network may be any network (e.g., data network, communication network, etc.) via which the mobile device connects to a system described herein or to an account (e.g., a financial institution account). The network may be a telecommunication network, a local area network (LAN), a wide area network (WAN), and/or a global area network (GAN), such as the Internet. The network may be secure and/or unsecure and may also include wireless and/or wireline and/or optical interconnection technology. Alternatively or additionally, the system may communicate with the mobile device via one or more short-range wireless communication mechanisms (e.g., near field communication NFC). Alternatively or additionally, a computing system associated with an agent at the facility may communicate with the mobile device via one or more long-range or short-range wireless communication mechanisms.

In some embodiments, the mobile device may initiate communication with the system by receiving readable indicia when the user enters the facility. The readable indicia may comprise any indicia, visual or non-visual, where information associated with the indicia is receivable or readable (e.g., scannable) by a mobile device. The readable indicia may comprise visual indicia, e.g., a barcode, a Quick Response (QR) code, or the like. The readable indicia may comprise any one-dimensional or two-dimensional code. The readable indicia may be dynamic such that the readable indicia may change from time to time. If the readable indicia is visual, the readable indicia may be presented on an electronic or physical board near the entrance of the facility. If the readable indicia is not visual, the readable indicia may be comprised in a tag (e.g., radio frequency identification (RFID) tag, near field communication (NFC) tag, or the like) located near the entrance of the facility. As used herein, the entrance of the facility may comprise a walk-in entrance (e.g., user walks in through the walk-in entrance) or a drive-through entrance (e.g., user drives in with the user's vehicle through the drive-through entrance).

Therefore, the user may use a mobile device that comprises an image-capturing component (e.g., a camera) to capture the image of the readable indicia. Alternatively, the user may bring the user's mobile device close to the tag to receive the readable indicia from the tag. When the user scans or captures an image of the readable indicia, the user is presented with an interface page on which the user may input the user's reason for visiting the facility, fill out one or more forms described herein, receive information (e.g., demonstrations, audiovisual content, or the like), or the like. In some embodiments, several readable indicia may be presented to the user, wherein different readable indicia are associated with different transactions. Therefore, when the user's mobile device receives the appropriate readable indicia, the readable indicia is linked to a form associated with a particular transaction or demonstrations or other information associated with a particular transaction. The user's input may be coded into a message and communicated via a wireless communication mechanism (e.g., long-range mechanism or short-range mechanism such as NFC) to the system described herein or to the computing system associated with an agent. Alternatively or additionally, the user's input may be coded into readable indicia, and an indicia-receiving device (e.g., an image-capturing device) at the facility (e.g., a computing system associated with the agent) may be used to receive the readable indicia from the user's mobile device. The indicia-receiving device may decode the readable indicia to receive the user input.

In some embodiments, after the system establishes communication with the mobile device (either prior to or after the user enters the facility) and determines there is a waiting period prior to the user being able to meet with an agent at the facility, the mobile device user interface may present the user with an option to chat with (e.g., via text) or have an audio or video conference (via the user's mobile device or via a computing device at the facility) with an agent (either human or virtual) at a central location (e.g., a remote location away from the facility). This option may be presented either prior to or after learning the user's intended transaction at the facility. In some embodiments, this option may be presented when the waiting period is equal to or greater than a predetermined minimum duration. The remote agent may provide step-by-step instructions for enabling the user to execute the transaction via the user's mobile device (or via an ATM at the facility). Additionally or alternatively, the agent may execute the transaction after receiving the user's approval if the transaction can be executed via chatting or via an audio or video conference.

In some embodiments, the user may be able to conduct an audio or video conference with the remote agent. As previously explained, the remote agent may provide step-by-step instructions for the user to execute the transaction via the user's mobile device. Additionally or alternatively, the remote agent may direct the user to an available kiosk (e.g., workstation, ATM, or other computing device) at the facility. The remote agent may then provide step-by-step instructions for the user to execute the transaction on the kiosk. The remote agent may continue to communicate with the user while the user is executing the transaction. Additionally or alternatively, after receiving the user's permission, the remote agent may execute the transaction on the remote agent's computing device or on the kiosk at the facility so that the user may view the execution of the transaction.

In some embodiments, the system may enable the user to bookmark the transaction. Therefore, a user or an agent (e.g., agent at the facility or remote agent) may initiate a transaction on the user's mobile device or on a computing device or kiosk at the facility or located remotely from the facility. The user or the agent may stop working on the transaction at any time prior to completing the transaction. For example, the user may stop working on the transaction if the user is running out of time. When the user or the agent stops working on the transaction but wants to save the work completed on the transaction, the user or the agent may select a "bookmarking" option on the user interface of the computing device.

When the bookmarking option is selected, the partially completed work (e.g., a partially completed form) may be saved and associated with the user's account. The partially completed work may be packaged into a file (e.g., a bookmark file). Alternatively, the bookmark file may comprise a bookmark link to the partially completed work. The bookmark file may be transmitted from one computing device to another computing device via any of the short-range or long-range wireless or wired mechanisms described herein. The bookmark file may be communicated from the user to the agent or another user (or from the agent to the user or another user) via email, text message, social networking message, or financial institution networking message.

At a later time, the user or agent may access the partially completed work by opening the bookmark file. The bookmark file may be opened on a different computing device from the device on which the transaction was initiated. A user may or may not need to be authenticated to the user's account in order to open the bookmark file and continue working on the transaction. As an example, the user may transmit the bookmark file to an agent (either at the facility or a remote agent) and the agent may continue working on the transaction on the agent's computing device. As a further example, the user may transmit the bookmark file from the user's computing device (e.g., mobile device) to another user's computing device (e.g., mobile device). As a further example, the agent may transmit the bookmark file from the agent's computing device or from a kiosk or ATM at the facility to the user's computing device.

As a further example, the user may initiate a transaction at the facility (e.g., a kiosk at the facility) or ATM and may bookmark the transaction. The user can access the partially completed transaction at a later time at a different facility (e.g., a kiosk at the facility) or ATM.

Therefore, in some embodiments, a user may initiate the transaction prior to arriving at the facility, and may continue to work on the transaction at the facility (either on the user's mobile device or on a computing device at the facility) by accessing a bookmark file. As described previously, the bookmark file may comprise the saved transaction work or may comprise a link to saved transaction work wherein the saved transaction work may be saved at a remote server. Alternatively, a user may initiate a transaction (or work on a previously bookmarked transaction) at the facility. At the facility, the user may work on the transaction with the assistance of an agent at the facility or a remote agent. If the user is running out of time and needs to exit the facility before completing the transaction, the user can bookmark the transaction and continue working on the transaction (either on the same computing device or a different computing device) at a later time after leaving the facility (e.g., at the user's home).

Referring now to FIG. 6, FIG. 6 presents an exemplary block diagram of the system environment 600 for implementing the process flows described in FIGS. 1, 2, and 3 in accordance with embodiments of the present invention. As illustrated, the system environment 600 includes a network 610, a system 630, a user input system 640 and an agent input system 691. Also shown in FIG. 6 is a user 645 of the user input system 640. The user input system 640 may be a mobile device described herein. The user 645 may be a person who uses the user input system 640 to execute a user application 647. The user application 647 may be an application to communicate with the system 630, perform a transaction, input information onto a user interface presented on the user input system 640, or the like. The user application 647 and/or the system application 637 may incorporate one or more parts of any process flow described herein.

As shown in FIG. 6, the system 630, and the user input system 640 are each operatively and selectively connected to the network 610, which may include one or more separate networks. In addition, the network 610 may include a telecommunication network, local area network (LAN), a wide area network (WAN), and/or a global area network (GAN), such as the Internet. It will also be understood that the network 610 may be secure and/or unsecure and may also include wireless and/or wireline and/or optical interconnection technology.

The user input system 640 may include any computerized apparatus that can be configured to perform any one or more of the functions of the user input system 640 described and/or contemplated herein. For example, the user 645 may use the user input system 640 to transmit and/or receive information or commands to and from the system 630. In some embodiments, for example, the user input system 640 may include a personal computer system, a mobile computing device, a personal digital assistant, a mobile phone, a tablet computing device, a network device, and/or the like. As illustrated in FIG. 6, in accordance with some embodiments of the present invention, the user input system 640 includes a communication interface 642, a processor 644, a memory 646 having an user application 647 stored therein, and a user interface 649. In such embodiments, the communication interface 642 is operatively and selectively connected to the processor 644, which is operatively and selectively connected to the user interface 649 and the memory 646. In some embodiments, the user 645 may use the user application 647 to execute processes described with respect to the process flows described herein.

Each communication interface described herein, including the communication interface 642, generally includes hardware, and, in some instances, software, that enables the user input system 640, to transport, send, receive, and/or otherwise communicate information to and/or from the communication interface of one or more other systems on the network 610. For example, the communication interface 642 of the user input system 640 may include a wireless transceiver, modem, server, electrical connection, and/or other electronic device that operatively connects the user input system 640 to another system such as the system 630. The wireless transceiver may include a radio circuit to enable wireless transmission and reception of information. Additionally, the user input system 640 may include a positioning system. The positioning system (e.g., a global positing system GPS) may enable at least one of the user input system 640 or an external server or computing device in communication with the user input system 640 to determine the location (e.g., location coordinates) of the user input system 640.

Each processor described herein, including the processor 644, generally includes circuitry for implementing the audio, visual, and/or logic functions of the user input system 640. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 647 of the memory 646 of the user input system 640.

Each memory device described herein, including the memory 646 for storing the user application 647 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 6, the memory 646 includes the user application 647. In some embodiments, the user application 647 includes an interface for communicating with, navigating, controlling, configuring, and/or using the user input system 640. In some embodiments, the user application 647 includes computer-executable program code portions for instructing the processor 644 to perform one or more of the functions of the user application 647 described and/or contemplated herein. In some embodiments, the user application 647 may include and/or use one or more network and/or system communication protocols.

Also shown in FIG. 6 is the user interface 649. In some embodiments, the user interface 649 includes one or more output devices, such as a display and/or speaker, for presenting information to the user 645. In some embodiments, the user interface 649 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 645. In some embodiments, the user interface 649 includes the input and display devices of a mobile device, which are operable to receive and display information.

The agent input system 691 comprises the features present in the user input system 640. For example, the agent input system 691 may comprise a computing system connected to an external display. As a further example, the agent input system 691 may comprise a mobile touchscreen tablet computing system or a portable mobile communication device. In some embodiments, the agent input system 691 may be comprised in the system 630. Therefore, the system 630 may control the agent input system 691.

FIG. 6 also illustrates a system 630, in accordance with an embodiment of the present invention. The system 630 may include any computerized apparatus that can be configured to perform any one or more of the functions of the system 630 described and/or contemplated herein. In accordance with some embodiments, for example, the system 630 may include a computer network, an engine, a platform, a server, a database system, a front end system, a back end system, a personal computer system, and/or the like. Therefore, the system 630 may be a server managed by the entity. The system 630 may be located at the facility associated with the entity or remotely from the facility associated with the entity. In some embodiments, such as the one illustrated in FIG. 6, the system 630 includes a communication interface 632, a processor 634, and a memory 636, which includes a system application 637 and a datastore 638 stored therein. As shown, the communication interface 632 is operatively and selectively connected to the processor 634, which is operatively and selectively connected to the memory 636.

It will be understood that the system application 637 may be configured to implement any one or more portions of the various user interfaces and/or process flow described herein.

The system application 637 may interact with the user application 647. It will also be understood that, in some embodiments, the memory includes other applications. It will also be understood that, in some embodiments, the system application 637 is configured to communicate with the datastore 638, the user input system 640, etc.

It will be further understood that, in some embodiments, the system application 637 includes computer-executable program code portions for instructing the processor 634 to perform any one or more of the functions of the system application 637 described and/or contemplated herein. In some embodiments, the system application 637 may include and/or use one or more network and/or system communication protocols.

In addition to the system application 637, the memory 636 also includes the datastore 638. As used herein, the datastore 638 may be one or more distinct and/or remote datastores. In some embodiments, the datastore 638 is not located within the system and is instead located remotely from the system. In some embodiments, the datastore 638 stores information or data described herein. For example, the datastore 638 may store information associated with the user's account.

It will be understood that the datastore 638 may include any one or more storage devices, including, but not limited to, datastores, databases, and/or any of the other storage devices typically associated with a computer system. It will also be understood that the datastore 638 may store information in any known way, such as, for example, by using one or more computer codes and/or languages, alphanumeric character strings, data sets, figures, tables, charts, links, documents, and/or the like. Further, in some embodiments, the datastore 638 may include information associated with one or more applications, such as, for example, the system application 637. It will also be understood that, in some embodiments, the datastore 638 provides a substantially real-time representation of the information stored therein, so that, for example, when the processor 634 accesses the datastore 638, the information stored therein is current or substantially current.

It will be understood that the embodiment of the system environment illustrated in FIG. 6 is exemplary and that other embodiments may vary. As another example, in some embodiments, the system 630 includes more, less, or different components. As another example, in some embodiments, some or all of the portions of the system environment 600 may be combined into a single portion. Likewise, in some embodiments, some or all of the portions of the system 630 may be separated into two or more distinct portions.

In addition, the various portions of the system environment 600 may be maintained for and/or by the same or separate parties. It will also be understood that the system 630 may include and/or implement any embodiment of the present invention described and/or contemplated herein. For example, in some embodiments, the system 630 is configured to implement any one or more of the embodiments of the process flows described and/or contemplated herein in connection any process flow described herein. Additionally, the system 630, the user input system 640, or the agent input system 691 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for serving a user at a facility, the apparatus comprising:
   a memory;
   at least one processor; and
   a module stored in the memory, wherein said module comprising computer instruction code executable by the at least one processor, and structured to cause said at least one processor to:
   determine a user has entered a facility or is a predetermined distance from the facility, wherein the user has a mobile device, and wherein the user is waiting to interact with at least one of an agent at the facility or a computing device at the facility, wherein the facility is a financial institution;
   electronically transmit a readable indicia for display on a computing device at an entrance associated with the facility, wherein transmitting further comprises transmitting control signals to reconfigure the computing device at the entrance to display the readable indicia, wherein the readable indicia is associated with one or more options related to one or more reasons for the user's visit to the facility;
   receive an indication that the mobile device associated with the user has received the readable indicia, wherein the readable indicia is received using an image capturing component associated with the mobile device;
   initiate communication with the mobile device of the user based on at least receiving the indication that the mobile device has received the readable indicia, wherein initiating further comprises establishing a communication link with a wireless transceiver associated with the mobile device of the user comprising a radio circuit that enables wireless transmission and reception of information with the mobile device of the user;
   electronically receive information from the mobile device, the information comprising at least one of information associated with the mobile device, information associated with the user, or information associated with the user's account;
   identify the user based on at least information received from the mobile device;
   initiate a facility service application on the mobile device of the user based on at least the initiated communication, wherein the facility service application comprises a user interface, wherein the user interface comprises the one or more options associated with a reason for the user's visit to the facility, the reason comprising a transaction intended to be executed by the user at the facility;
   electronically receive an indication that the user has selected the reason for the user's visit to the facility;
   electronically transmit via the established communication link, information associated with the transaction intended to be executed by the user at the facility based on at least receiving an indication that the user has selected the reason for the user's visit to the facility, wherein the transmitted information guides the user on how to execute the transaction prior to meeting with an agent associated with the financial institution;
   determine the transaction can be completely executed on the mobile device;
   electronically transmit via the established communication link, a form associated with the intended transaction to the user's mobile device based on at least the user selection of the intended transaction, the form prompting the user to input information associated with the intended transaction;
electronically monitor via the established communication link, communication traffic associated with the user's mobile device to determine portions of form filled by the user using the user's mobile device;
determine that the user has executed at least a partial execution associated with the transaction based on at least monitoring the communication traffic associated with the user's mobile device;
store the partially executed transaction on a financial institution database, wherein storing further comprises generating a bookmark to be associated with the user's account, wherein the bookmark comprises a point of continuity to continue performing a remaining portion of the transaction, wherein the bookmark further comprises an indication of the storage location of the partially executed transaction on the financial institution database;
direct the user to the agent based on at least a predetermined time after the user execution of the partial action on the mobile device, wherein directing further comprises electronically transmitting the bookmark to a mobile device associated with the agent;
electronically receive the bookmark from the mobile device associated with the agent;
retrieve the partially executed transaction from the financial institution database based on at least receiving the bookmark from the mobile device associated with the agent;
electronically continue execution of the remaining portion of the intended transaction using a computing device associated with the facility;
electronically receive, via computing device associated with the facility, an indication from the user that the user has to leave the facility prior to completing the execution of the remaining portion of the intended transaction at the facility;
update the bookmark based on at least the user's continued execution of the remaining portion of the intended transaction using the computing device associated with the facility, wherein the updated bookmark comprises a point of continuity indicating a portion of the transaction executed by the user at the facility;
receive an indication that the user wishes to continue execution of the remaining portion of the intended transaction;
determine that the indication is received from a second computing device different from the mobile device of the user;
establish a communication link with the second computing device, wherein establishing further comprises creating a data channel with the second computing device;
initiate, via the established communication link, an authentication interface prompting the user to enter additional authentication credentials to access the updated bookmark based on at least determining that the user wishes to continue execution of the remaining portion of the intended transaction using the second computing device that is different from the mobile device of the user used to initially create the bookmark;
electronically validate the authentication credentials received from the user;
retrieve a partially executed transaction from the financial institution database based on at least validating the authentication credentials received from the user and receiving the updated bookmark from the second computing device of the user; and
electronically enable the user to complete execution of the remaining portion of the intended transaction using the second computing device.

2. The apparatus of claim 1, wherein the user has an account managed by the entity.

3. The apparatus of claim 2, wherein the entity comprises a financial institution.

4. The apparatus of claim 1, wherein the module is configured to determine a wait period for the user to interact with the agent at the facility or the computing device at the facility, and wherein a type of the form transmitted to the user's mobile device is based on the wait period.

5. The apparatus of claim 1, wherein the user-filled form is at least one of viewed by the agent at the facility or processed by the apparatus.

6. The apparatus of claim 1, wherein in response to receiving the user-filled form, the module is configured to direct the user to the agent at the facility or the computing device at the facility.

7. The apparatus of claim 1, wherein the transmitted information comprises audiovisual content.

8. The apparatus of claim 1, wherein, the module is further configured to transmit information associated with the intended transaction to the mobile device, wherein the information enables the user to execute the transaction on the mobile device.

9. The apparatus of claim 1, wherein the information enables the user to execute the transaction without interacting with the agent associated with the facility.

10. The apparatus of claim 1, wherein the communication occurs via one or more long-range or short-range wireless communication methods or via readable indicia.

11. The apparatus of claim 1, wherein the communication with the mobile device comprises:
prompting the user to input, on the mobile device, the reason for the user's visit;
receiving the reason for the user's visit from the mobile device,
wherein the user inputs the reason by inputting text or voice into the mobile device or by selecting one or more transactions from a list of transactions presented on a user interface of the mobile device, wherein the list of transactions comprises at least one of a last transaction executed by the user, a transaction most frequently executed by the user during a predetermined period, a transaction most frequently executed by users who visit the facility, or a transaction most frequently executed by users who visit the facility with a similar user profile as the user.

12. The apparatus of claim 1, wherein the user entered the facility via a drive-through lane associated with the facility.

13. The apparatus of claim 1, wherein the mobile device comprises or is part of a motor vehicle.

14. A method for serving a user at a facility, the method comprising:
determine a user has entered a facility or is a predetermined distance from the facility, wherein the user has a mobile device, and wherein the user is waiting to interact with at least one of an agent at the facility or a computing device at the facility, wherein the facility is a financial institution;
electronically transmitting a readable indicia for display on a computing device at an entrance associated with the facility, wherein transmitting further comprises transmitting control signals to reconfigure the computing device at the entrance to display the readable indicia, wherein the readable indicia is associated with one or more options related to one or more reasons for the user's visit to the facility;

receiving an indication that the mobile device associated with the user has received the readable indicia, wherein the readable indicia is received using an image capturing component associated with the mobile device;

initiating communication with the mobile device of the user based on at least receiving the indication that the mobile device has received the readable indicia, wherein initiating further comprises establishing a communication link with a wireless transceiver associated with the mobile device of the user comprising a radio circuit that enables wireless transmission and reception of information with the mobile device of the user;

electronically receiving information from the mobile device, the information comprising at least one of information associated with the mobile device, information associated with the user, or information associated with the user's account;

identifying the user based on at least information received from the mobile device;

initiating a facility service application on the mobile device of the user based on at least the initiated communication, wherein the facility service application comprises a user interface, wherein the user interface comprises the one or more options associated with a reason for the user's visit to the facility, the reason comprising a transaction intended to be executed by the user at the facility;

electronically receiving an indication that the user has selected the reason for the user's visit to the facility;

electronically transmitting via the established communication link, information associated with the transaction intended to be executed by the user at the facility based on at least receiving an indication that the user has selected the reason for the user's visit to the facility, wherein the transmitted information guides the user on how to execute the transactions transaction prior to meeting with an agent associated with the financial institution;

determining the transaction can be completely executed on the mobile device;

electronically transmitting via the established communication link, a form associated with the intended transaction to the user's mobile device based on at least the user selection of the intended transaction, the form prompting the user to input information associated with the intended transaction;

electronically monitoring via the established communication link, communication traffic associated with the user's mobile device to determine portions of form filled by the user using the user's mobile device;

determining that the user has executed at least a partial execution associated with the transaction based on at least monitoring the communication traffic associated with the user's mobile device;

storing the partially executed transaction on a financial institution database, wherein storing further comprises generating a bookmark to be associated with the user's account, wherein the bookmark comprises a point of continuity to continue performing a remaining portion of the transaction, wherein the bookmark further comprises an indication of the storage location of the partially executed transaction on the financial institution database;

directing the user to the agent based on at least a predetermined time after the user execution of the partial action on the mobile device, wherein directing further comprises electronically transmitting the bookmark to a mobile device associated with the agent;

electronically receiving the bookmark from the mobile device associated with the agent;

retrieving the partially executed transaction from the financial institution database based on at least receiving the bookmark from the mobile device associated with the agent;

electronically continuing execution of the remaining portion of the intended transaction using a computing device associated with the facility;

electronically receiving, via computing device associated with the facility, an indication from the user that the user has to leave the facility prior to completing the execution of the remaining portion of the intended transaction at the facility;

updating the bookmark based on at least the user's continued execution of the remaining portion of the intended transaction using the computing device associated with the facility, wherein the updated bookmark comprises a point of continuity indicating a portion of the transaction executed by the user at the facility;

receiving an indication that the user wishes to continue execution of the remaining portion of the intended transaction;

determining that the indication is received from a second computing device different from the mobile device of the user;

establishing a communication link with the second computing device, wherein establishing further comprises creating a data channel with the second computing device;

initiating, via the established communication link, an authentication interface prompting the user to enter additional authentication credentials to access the updated bookmark based on at least determining that the user wishes to continue execution of the remaining portion of the intended transaction using the second computing device that is different from the mobile device of the user used to initially create the bookmark;

electronically validating the authentication credentials received from the user;

retrieving a partially executed transaction from the financial institution database based on at least validating the authentication credentials received from the user and receiving the updated bookmark from the second computing device of the user; and electronically enabling the user to complete execution of the remaining portion of the intended transaction using the second computing device.

15. A computer program product for serving a user at a facility, the computer program product comprising:

a non-transitory computer-readable medium comprising a set of codes for causing a computer to:

determine a user has entered a facility or is a predetermined distance from the facility, wherein the user has a mobile device, and wherein the user is waiting to interact with at least one of an agent at the facility or a computing device at the facility, wherein the facility is a financial institution;

electronically transmit a readable indicia for display on a computing device at an entrance associated with the facility, wherein transmitting further comprises transmitting control signals to reconfigure the computing device at the entrance to display the readable indicia, wherein the readable indicia is associated with one or more options related to one or more reasons for the user's visit to the facility;

receive an indication that the mobile device associated with the user has received the readable indicia, wherein the readable indicia is received using an image capturing component associated with the mobile device;

initiate communication with the mobile device of the user based on at least receiving the indication that the mobile device has received the readable indicia, wherein initiating further comprises establishing a communication link with a wireless transceiver associated with the mobile device of the user comprising a radio circuit that enables wireless transmission and reception of information with the mobile device of the user;

electronically receive information from the mobile device, the information comprising at least one of information associated with the mobile device, information associated with the user, or information associated with the user's account;

identify the user based on at least information received from the mobile device;

initiate a facility service application on the mobile device of the user based on at least the initiated communication, wherein the facility service application comprises a user interface, wherein the user interface comprises the one or more options associated with a reason for the user's visit to the facility, the reason comprising a transaction intended to be executed by the user at the facility;

electronically receive an indication that the user has selected the reason for the user's visit to the facility;

electronically transmit via the established communication link, information associated with the transaction intended to be executed by the user at the facility based on at least receiving an indication that the user has selected the reason for the user's visit to the facility, wherein the transmitted information guides the user on how to execute the transaction prior to meeting with an agent associated with the financial institution;

determine the transaction can be completely executed on the mobile device;

electronically transmit via the established communication link, a form associated with the intended transaction to the user's mobile device based on at least the user selection of the intended transaction, the form prompting the user to input information associated with the intended transaction;

electronically monitor via the established communication link, communication traffic associated with the user's mobile device to determine portions of form filled by the user using the user's mobile device;

determine that the user has executed at least a partial execution associated with the transaction based on at least monitoring the communication traffic associated with the user's mobile device;

store the partially executed transaction on a financial institution database, wherein storing further comprises generating a bookmark to be associated with the user's account, wherein the bookmark comprises a point of continuity to continue performing a remaining portion of the transaction, wherein the bookmark further comprises an indication of the storage location of the partially executed transaction on the financial institution database;

direct the user to the agent based on at least a predetermined time after the user execution of the partial action on the mobile device, wherein directing further comprises electronically transmitting the bookmark to a mobile device associated with the agent;

electronically receive the bookmark from the mobile device associated with the agent;

retrieve the partially executed transaction from the financial institution database based on at least receiving the bookmark from the mobile device associated with the agent;

electronically continue execution of the remaining portion of the intended transaction using a computing device associated with the facility;

electronically receive, via computing device associated with the facility, an indication from the user that the user has to leave the facility prior to completing the execution of the remaining portion of the intended transaction at the facility;

update the bookmark based on at least the user's continued execution of the remaining portion of the intended transaction using the computing device associated with the facility, wherein the updated bookmark comprises a point of continuity indicating a portion of the transaction executed by the user at the facility;

receive an indication that the user wishes to continue execution of the remaining portion of the intended transaction;

determine that the indication is received from a second computing device different from the mobile device of the user;

establish a communication link with the second computing device, wherein establishing further comprises creating a data channel with the second computing device;

initiate, via the established communication link, an authentication interface prompting the user to enter additional authentication credentials to access the updated bookmark based on at least determining that the user wishes to continue execution of the remaining portion of the intended transaction using the second computing device that is different from the mobile device of the user used to initially create the bookmark;

electronically validate the authentication credentials received from the user;

retrieve a partially executed transaction from the financial institution database based on at least validating the authentication credentials received from the user and receiving the updated bookmark from the second computing device of the user; and electronically enable the user to complete execution of the remaining portion of the intended transaction using the second computing device.

* * * * *